US012673433B2

(12) United States Patent
Wei

(10) Patent No.: US 12,673,433 B2
(45) Date of Patent: Jul. 7, 2026

(54) ANGLE-ROTATABLE FIXTURE DEVICE FOR NEEDLES

(71) Applicant: Fu-Han Wei, Taichung City (TW)

(72) Inventor: Fu-Han Wei, Taichung City (TW)

(73) Assignee: Jun-Sheng Wei, Taichung City (TW)

( * ) Notice: Subject to any disclaimer, the term of this patent is extended or adjusted under 35 U.S.C. 154(b) by 723 days.

(21) Appl. No.: 18/141,420

(22) Filed: Apr. 30, 2023

(65) Prior Publication Data

US 2024/0359336 A1     Oct. 31, 2024

(51) Int. Cl.
B25J 15/00 (2006.01)

(52) U.S. Cl.
CPC ....... B25J 15/0019 (2013.01); B25J 15/0095 (2013.01); *B25J 15/0071* (2013.01)

(58) Field of Classification Search
CPC . B25J 15/0019; B25J 15/0095; B25J 15/0071
USPC ........................................................ 294/213
See application file for complete search history.

(56) References Cited

FOREIGN PATENT DOCUMENTS

DE      102017209661 A1 * 10/2018  .......... B25J 15/0019

OTHER PUBLICATIONS

DE_102017209661_A1_translate (Year: 2018).*

* cited by examiner

*Primary Examiner* — Robert W Hodge
*Assistant Examiner* — Rehman A Qureshi
(74) *Attorney, Agent, or Firm* — LANWAY IPR SERVICES; Chun-Ming Shih

(57) ABSTRACT

An angle-adjustable fixture device for needles contains: a body, multiple piston elements, multiple needle elements, multiple air valves, a fixing element, a rotatable element, a positioning element, a resilient element, and a support element. The body includes multiple air chambers, inner threads, and two air orifices. The respective one piston element includes a large-diameter disc and a small-diameter column, and the small-diameter column has two receiving orifices. A respective one needle element includes a tip. A respective one air valve includes an air feeding tube for pressurizing airs into the respective one air chamber. The fixing element includes a non-circular orifice. The rotatable element includes an opening and multiple cutouts. The support element includes multiple second spot-faced holes. The positioning element includes a shank, a coupling face, multiple stems, and an accommodation notch. The support element includes a trench corresponding to the accommodation notch and accommodates the resilient element.

3 Claims, 8 Drawing Sheets

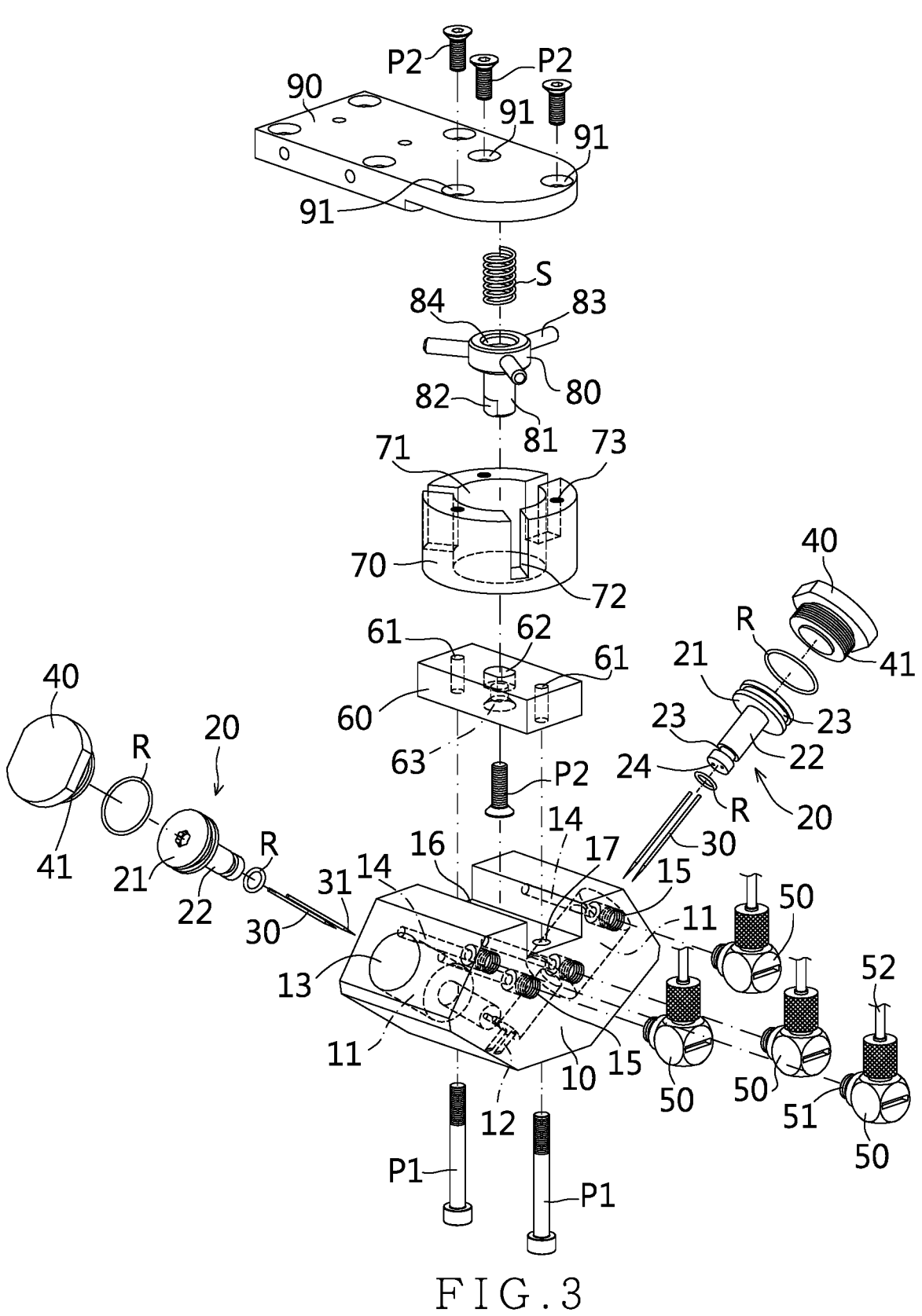
F I G . 3

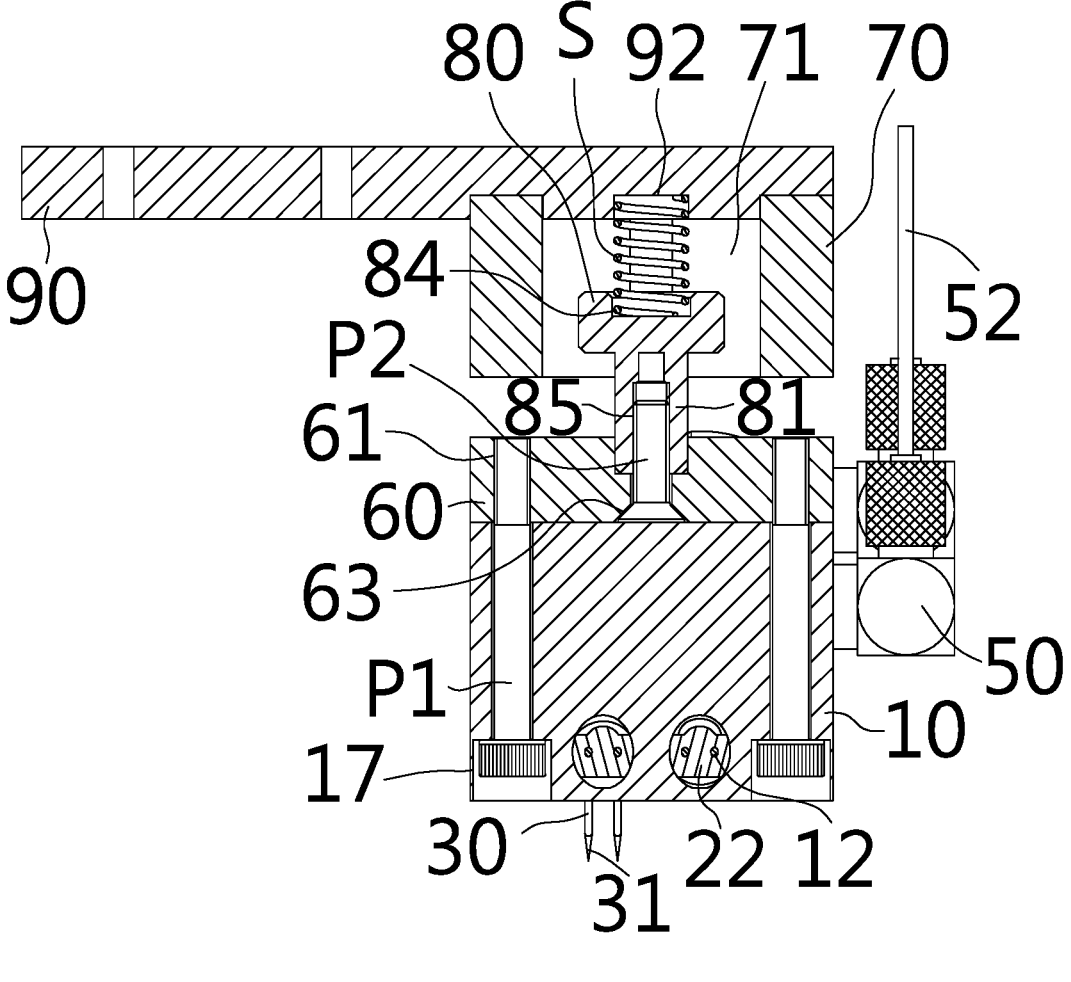
F I G . 4

ANGLE-ROTATABLE FIXTURE DEVICE FOR NEEDLES

TECHNICAL FIELD

The present disclosure relates to an angle-rotatable fixture device for needles which actuates multiple needle elements to pierce a flexible object by using multiple piston elements.

BACKGROUND

Conventionally, to realize the unmanned intelligent automatic injection molding process, general flexible plastic or rubber objects, such as insoles, etc., must be demoulded from the mold after injection molding, and then the molded flexible plastic or rubber objects are picked and shifted to the conveyor belt for the next operation process.

However, conventional fixtures include: clamps and vacuum suction cups, etc., wherein it is quite troublesome to use the clamps to clamp the flexible plastic or rubber objects, which is time-consuming and laborious, and it is easy to pinch the flexible plastic or rubber objects. As for the structure of the vacuum suction cup is complicated, the cost is high, and the clamping effect is not good at the same time.

The present invention has arisen to mitigate and/or obviate the afore-described disadvantages.

SUMMARY

A primary aspect of the present invention is to provide an angle-rotatable fixture device for needles which is simplified, has low fabrication cost, outstanding clamping effect, and easy operation.

To obtain above-mentioned aspect, an angle-rotatable fixture device for needles provided by the present invention contains: contains: a body, multiple piston elements, multiple needle elements, multiple air valves, a fixing element, a rotatable element, a positioning element, a resilient element, and a support element. The body includes multiple air chambers, inner threads, and two air orifices. The respective one piston element includes a large-diameter disc and a small-diameter column, and the small-diameter column has two receiving orifices. A respective one needle element includes a tip. A respective one air valve includes an air feeding tube for pressurizing airs into the respective one air chamber. The fixing element includes a non-circular orifice. The rotatable element includes an opening and multiple cutouts. The support element includes multiple second spotfaced holes. The positioning element includes a shank, a coupling face, multiple stems, and an accommodation notch. The support element includes a trench corresponding to the accommodation notch and accommodates the resilient element.

In operation, the airs are guided and pressurized into the respective one air chamber from the air feeding tube of a top air valve, such that the respective one piston element is pushed downward so that a tip of the respective one needle element extends to pierce the flexible object. On the contrary, the airs are guided and pressurized into the respective one air chamber from a bottom air valve to push the respective one piston element backward, such that the tip of the respective one needle element retracts to release the flexible object. Preferably, the body includes the rotatable element, the positioning element, and the resilient element so that the body mates with the curvature of the flexible object to rotate to a desired angle.

Other objects and features will be in part apparent and in part pointed out hereinafter.

BRIEF DESCRIPTION OF THE DRAWINGS

FIG. 3 is a perspective view showing the exploded components of the angle-adjustable fixture device for the needles according to the preferred embodiment of the present invention.

FIG. 4 is a cross-sectional view showing the assembly of the angle-adjustable fixture device for the needles according to the preferred embodiment of the present invention.

DETAILED DESCRIPTION

Figure 1:
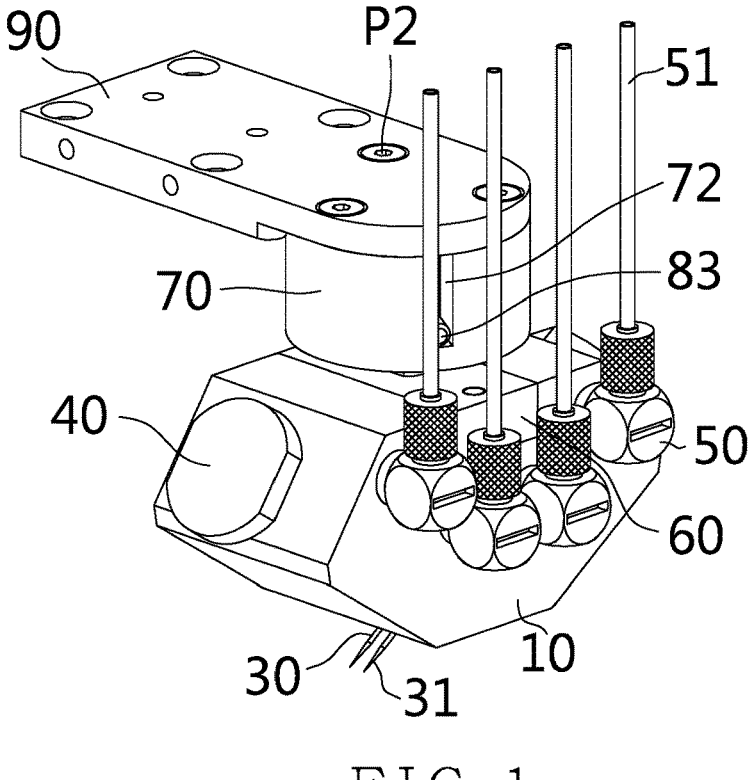
FIG. 1 is a perspective view showing the assembly of an angle-adjustable fixture device for needles according to a preferred embodiment of the present invention.
Figure 2:
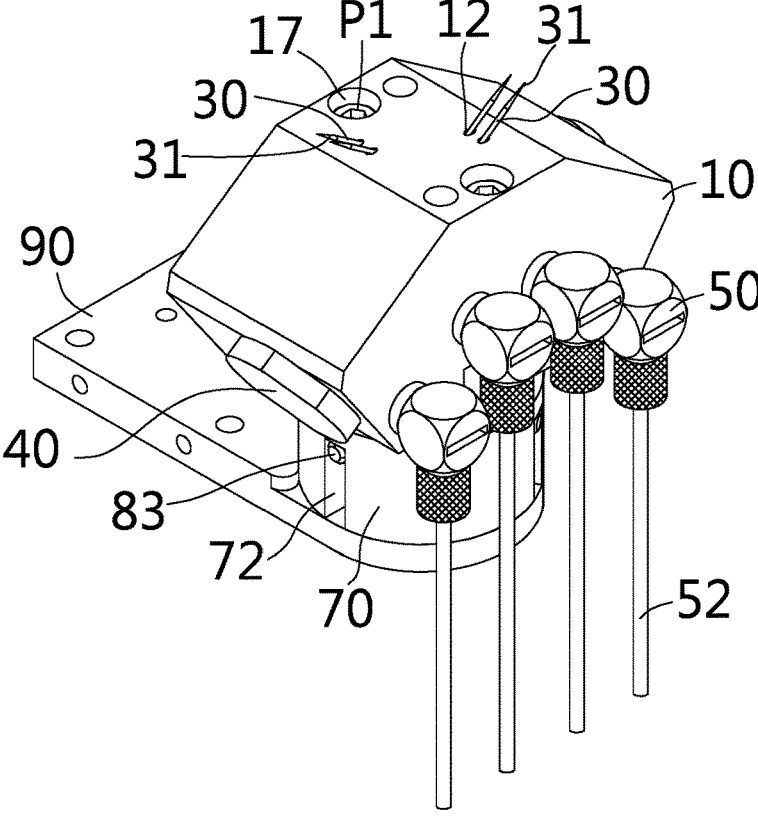
FIG. 2 is another perspective view showing the assembly of the angle-adjustable fixture device for the needles according to the preferred embodiment of the present invention.
Figure 5:
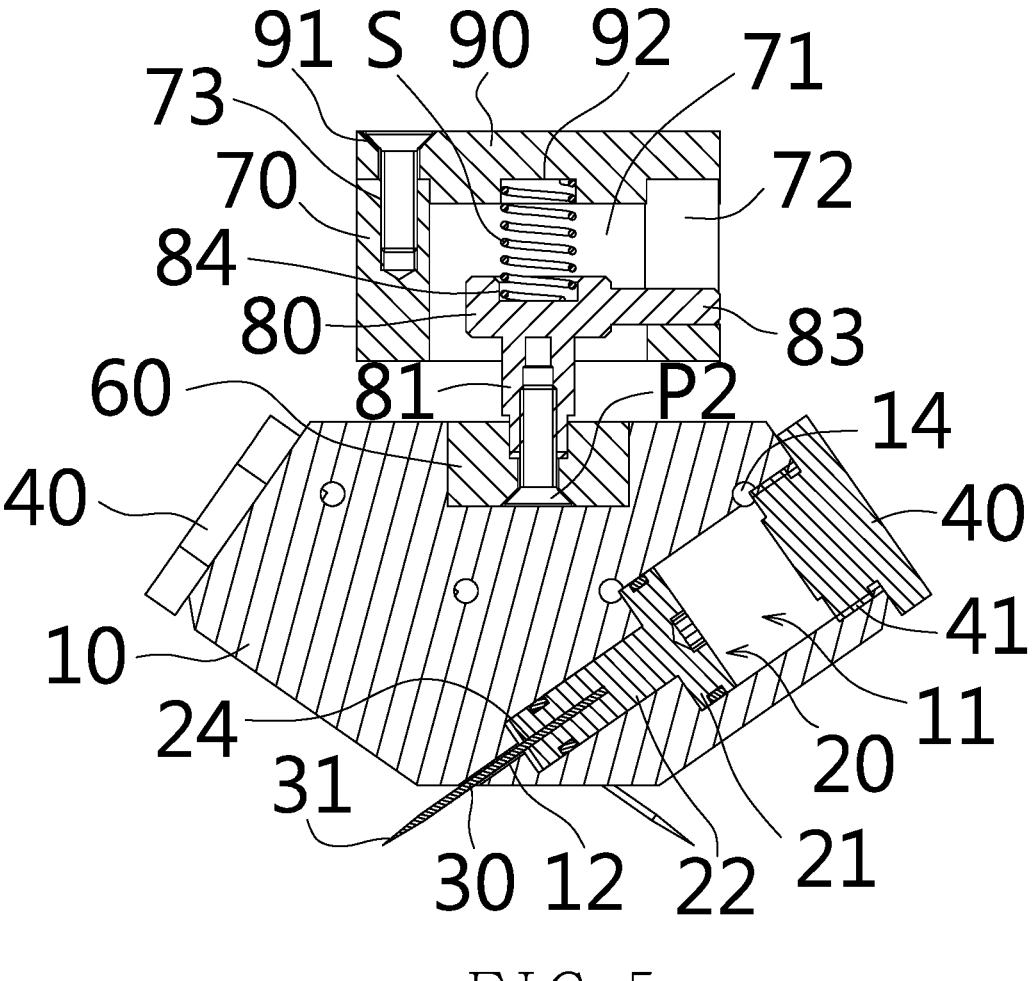
FIG. 5 is another cross-sectional view showing the assembly of the angle-adjustable fixture device for the needles according to the preferred embodiment of the present invention.

FIG. 1 is a perspective view showing the assembly of an angle-adjustable fixture device for needles according to a preferred embodiment of the present invention. FIG. 2 is another perspective view showing the assembly of the angle-adjustable fixture device for the needles according to the preferred embodiment of the present invention. FIG. 3 is a perspective view showing the exploded components of the angle-adjustable fixture device for the needles according to the preferred embodiment of the present invention. FIG. 4 is a cross sectional view showing the assembly of the angle-adjustable fixture device for the needles according to the preferred embodiment of the present invention. FIG. 5 is another cross sectional view showing the assembly of the angle-adjustable fixture device for the needles according to the preferred embodiment of the present invention. The angle-adjustable fixture device of the present invention comprises: a body 10, multiple piston elements 20, multiple needle elements 30, multiple connection elements 40, multiple air valves 50, a fixing element 60, a rotatable element 70, a positioning element 80, a resilient element S, a support element 90, two screw bolts P1, multiple screws P2, and multiple washers R; wherein the body 10 includes multiple air chambers 11 staggeredly defined on two sides thereof, wherein a respective one air chamber 11 includes a large-diameter portion formed on an upper end thereof, and the respective one chamber 11 includes a small-diameter portion formed on a lower end thereof and communicated with the large diameter portion so as to accommodate a respective one piston element 20, wherein the respective one air chamber 11 has two through orifices 12 extending from a bottom of the small-diameter portion and configured to receive two needle elements 30, inner threads 13 formed on the large-diameter portion of the respective one air chamber 11 and configured to screw with the multiple connection elements 40, two air orifices 14 extending from the body 10 to correspond to the large-diameter portion and the small-diameter portion of the respective one air chamber 11, two first threaded orifices 15 respectively extending outward from the two air orifices 14 to screw with the multiple air valves 50, wherein the body 10 further includes a recess 16 defined on a middle section of a top thereof and configured to receive the fixing element 60, wherein the recess 16 has two passing holes 17 through which the two screw bolts P1 are inserted to screw with the fixing element 60;

a respective one piston element 20 includes a large-diameter disc 21 and a small-diameter column 22, wherein a diameter of the large-diameter disc 21 is equal to a diameter of the large-diameter portion of the respective one air chamber 11, a diameter of the small-diameter column 22 is equal to a diameter of the small-diameter portion of the respective one air chamber 11, two grooves 23 respectively defined around the large-diameter disc 21 and the small-diameter column 22 to fit with the multiple washers R, such that the piston element 20 is airtight with the respective one air chamber 11, wherein the small-diameter column 22 has two receiving orifices 24 corresponding to the two through orifices 12 and configured to receive the multiple needle elements 30;

a respective one needle element 30 includes a tip 31 formed on an end thereof to pierce an flexible object 1;

a respective one connection element 40 includes outer threads 41 configured to screw with the inner threads 13 of the respective one air chamber 11;

a respective one air valve 50 includes a screwing extension 51 configured to screw with a respective one first threaded orifice 15 of a respective one air orifice 14, and an air feeding tube 52 perpendicular to the screwing extension 51 and configured to pressurize airs into the respective one air chamber 11 so that the respective one piston element 20 is pushed downward or upward by the airs to extend forward or extract backward to the respective one needle element 30;

the fixing element 60 includes two second threaded orifices 61 respectively defined on two side thereof and corresponding to the two passing holes 17 of the recess 16 to screw with the two screw bolts P1, a non-circular orifice 62 formed on a center of the fixing element 60, and a first spot-faced hole 63 defined below the non-circular orifice 62 and configured to receive one of the multiple screw P2;

the rotatable element 70 is columnar and includes an opening 71 defined therein, three cutouts 72 equidistantly defined around the opening 71 and configured to accommodate the positioning element 80, and multiple third threaded orifices 73 defined on a top of the rotatable element 70 and screwed with the other screws P2;

the positioning element 80 includes a shank 81 extending from a bottom thereof, a coupling face 82 formed on the shank 81 to correspond to and to be received in the non-circular orifice 62 of the fixing element 60, three stems 83 extending from an outer wall of the positioning element 80 and corresponding to the three cutouts 72 so that the positioning element 80 is adjustably rotated at three angles by using the three stems 83, and an accommodation notch 84 defined on a top of the positioning element 80 to accommodate the resilient element S;

The support element 90 is a support plate 91, and the support element 90 includes multiple second spot-faced holes 91 corresponding to the multiple third threaded orifices 73 of the rotatable element 70 and screwed with other screws P2 to fix the rotatable element, and a trench 92 corresponding to the accommodation notch 84 of the positioning element 80 and configured to accommodate the resilient element S.

Figure 6:
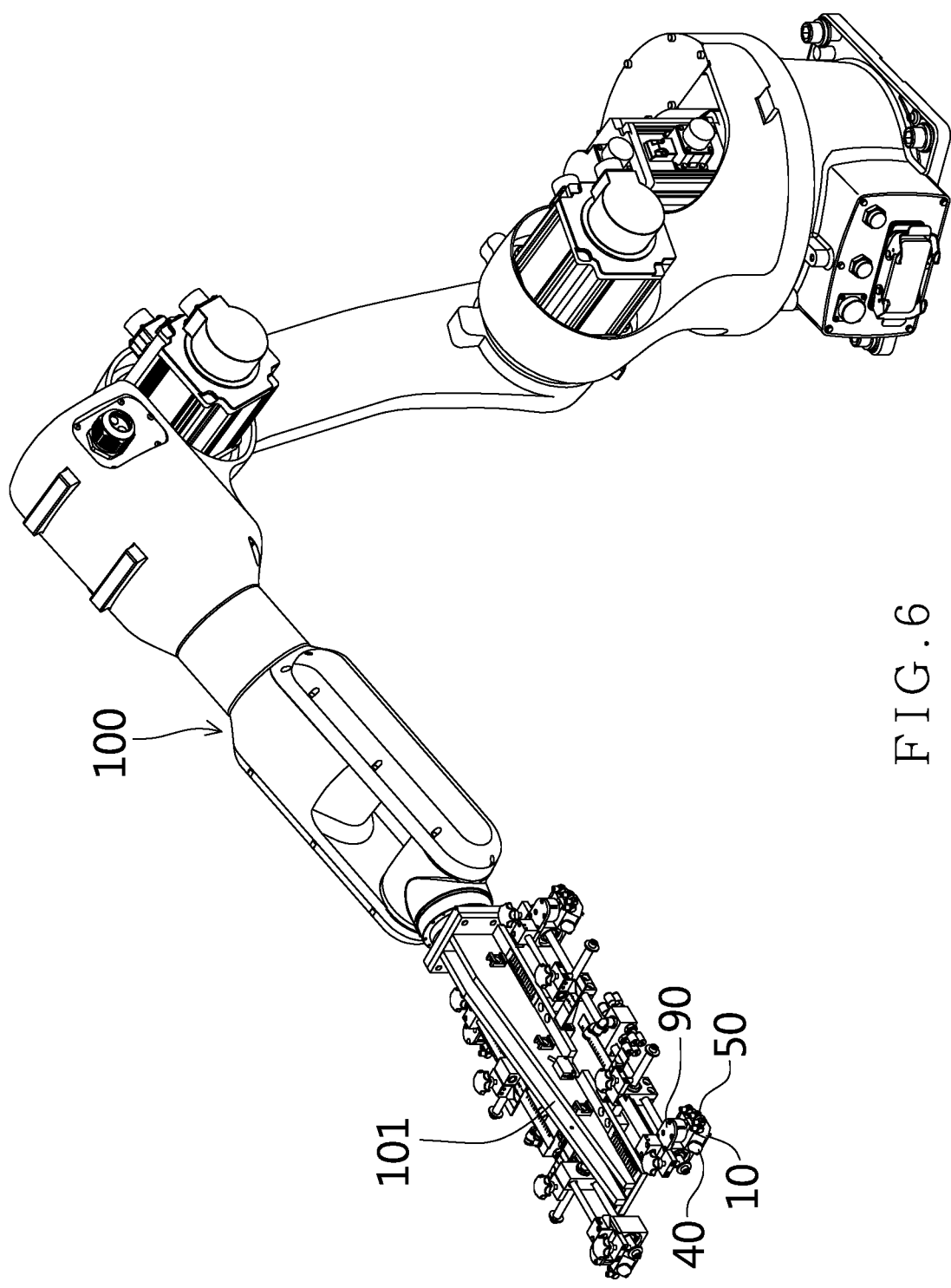
FIG. 6 is a perspective showing the application of the angle-adjustable fixture device for the needles according to the preferred embodiment of the present invention.
Figure 7:
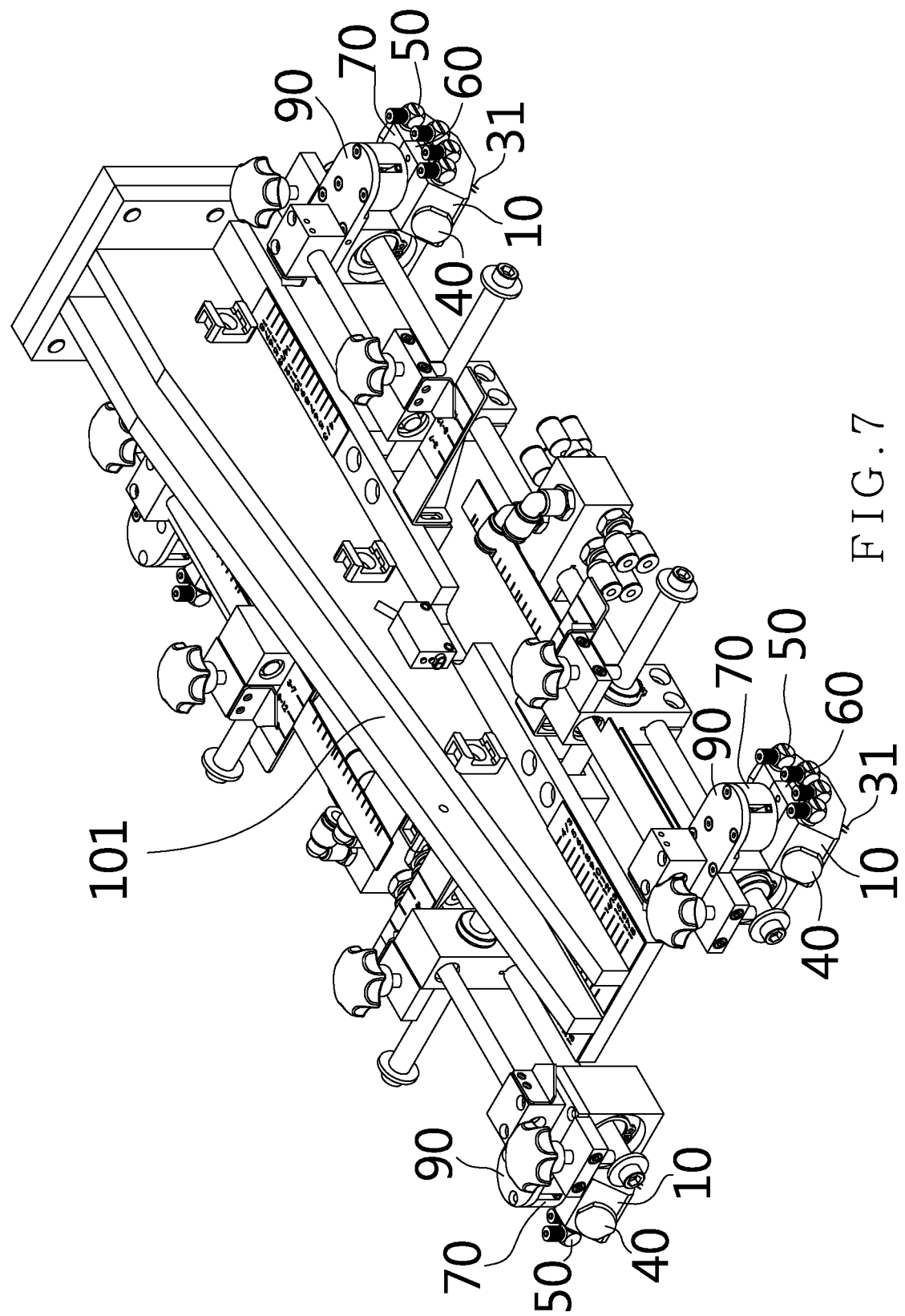
FIG. 7 is a perspective showing another application of the angle-adjustable fixture device for the needles according to the preferred embodiment of the present invention.

FIG. 6 is a perspective showing the application of the angle-adjustable fixture device for the needles according to the preferred embodiment of the present invention. For example, the angle-adjustable fixture device is applicable for a mechanical arm 100. FIG. 7 is a perspective showing another application of the angle-adjustable fixture device for the needles according to the preferred embodiment of the present invention. For example, multiple angle-adjustable fixture devices are applicable for a fixing rack 101, wherein the multiple support elements 90 of the multiple angle-adjustable fixture devices are mounted on the fixing rack 101 of the mechanical arm 100.

Figures 8, 9:
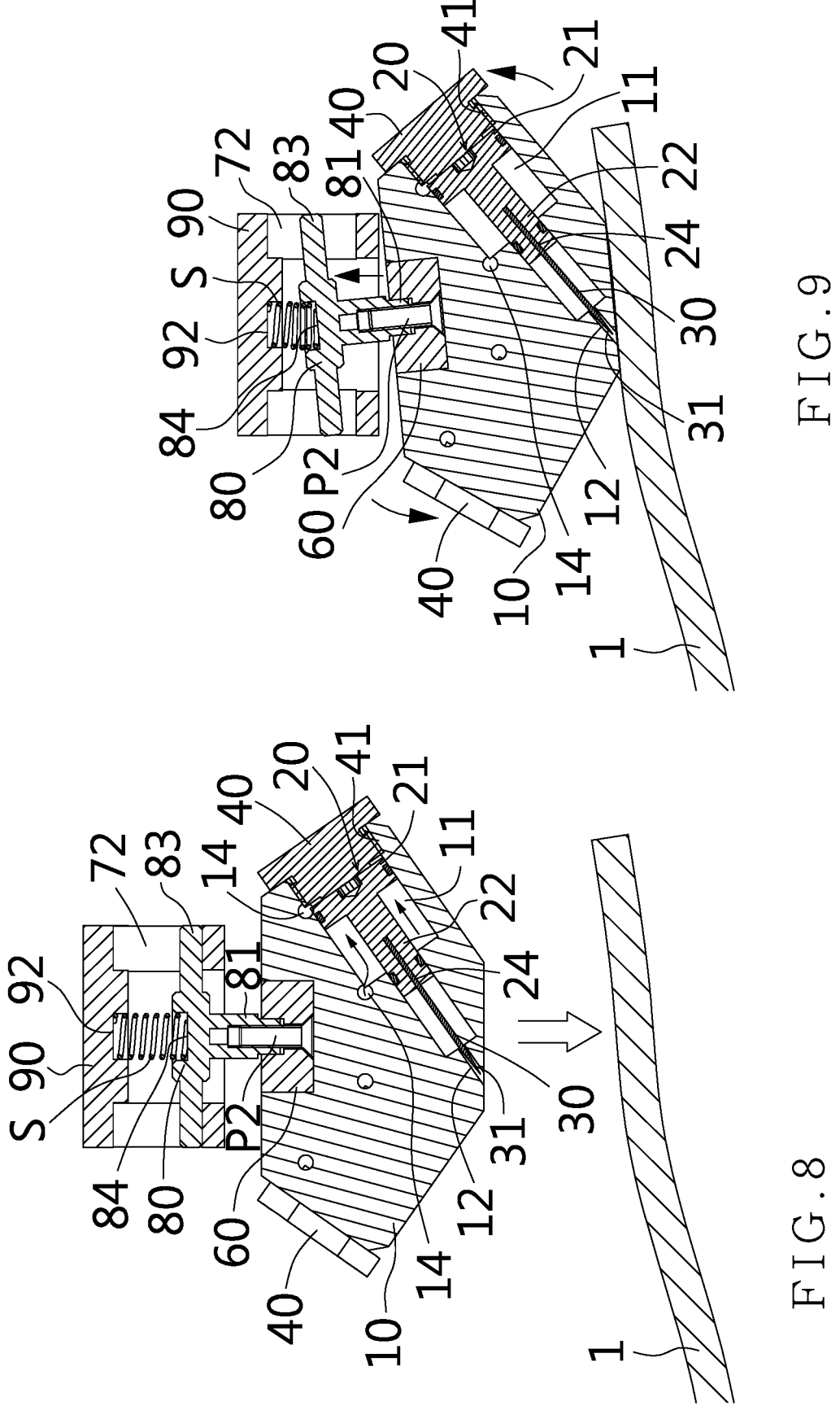
FIG. 8 is a cross sectional view showing the operation of the angle-adjustable fixture device for the needles according to the preferred embodiment of the present invention.
FIG. 9 is another cross sectional view showing the operation of the angle-adjustable fixture device for the needles according to the preferred embodiment of the present invention.

FIG. 8 is a cross sectional view showing the operation of the angle-adjustable fixture device for the needles according to the preferred embodiment of the present invention. The mechanical arm 100 actuates the multiple support elements 90 mounted on the fixing rack 101 to move downward.

FIG. 9 is another cross sectional view showing the operation of the angle-adjustable fixture device for the needles according to the preferred embodiment of the present invention. The three stems 83 of the positioning element 80 are tilted and rotated in the three cutouts 72 of the rotatable element 70 at multiple angles so that the body 10 is rotated to a desired angle with a curvature of the flexible object 1.

Figures 10, 11:
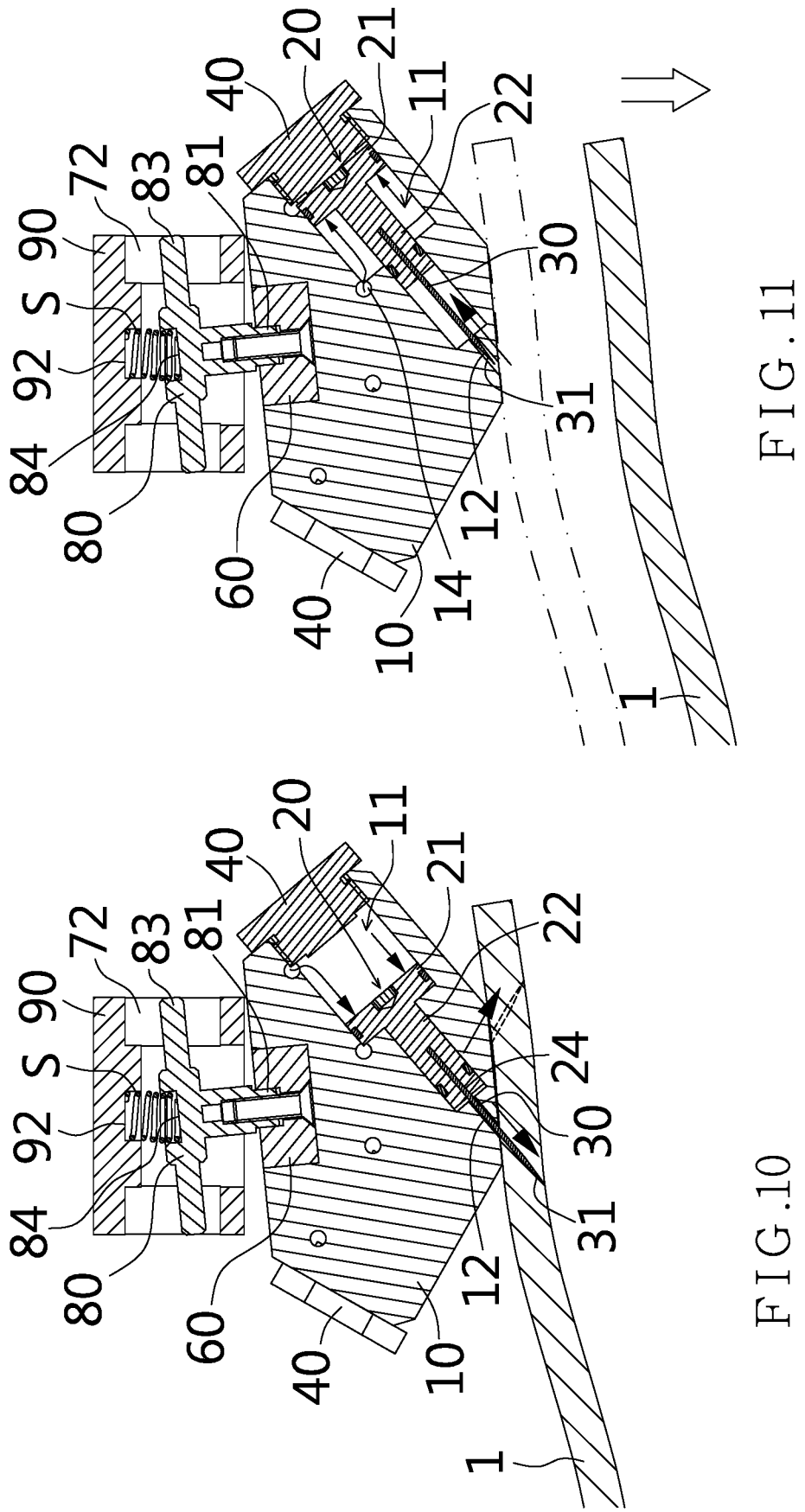
FIG. 10 is also another cross sectional view showing the operation of the angle-adjustable fixture device for the needles according to the preferred embodiment of the present invention.
FIG. 11 is still another cross sectional view showing the operation of the angle-adjustable fixture device for the needles according to the preferred embodiment of the present invention.

FIG. 10 is also another cross sectional view showing the operation of the angle-adjustable fixture device for the needles according to the preferred embodiment of the present invention. The airs are guided and pressurized into the respective one air chamber 11 from the air feeding tube 52 of a top air valve 50, such that the respective one piston element 20 is pushed downward so that a tip 31 of the respective one needle element 30 extends to pierce the flexible object 1.

FIG. 11 is still another cross sectional view showing the operation of the angle-adjustable fixture device for the needles according to the preferred embodiment of the present invention. The airs are guided and pressurized into the respective one air chamber 11 from a bottom air valve 50 to push the respective one piston element 20 backward, such that the tip 31 of the respective one needle element 30 retracts to release the flexible object 1.

Having described the invention in detail, it will be apparent that modifications and variations are possible without departing from the scope of the invention defined in the appended claims.

When introducing elements of the present invention or the preferred embodiments thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An angle-adjustable fixture device for needles comprising: a body, multiple piston elements, multiple needle elements, multiple air valves, a fixing element, a rotatable element, a positioning element, a resilient element, and a support element;

wherein a body includes multiple air chambers staggeredly defined on two sides thereof, and a respective one air chamber is configured to accommodate a respective one piston element, wherein the respective one air chamber has multiple through orifices extending from a lower end of the respective one air chamber and configured to receive the multiple needle elements, inner threads formed on an upper end of the respective one air chamber and configured to screw with the multiple connection elements, and two air orifices extending from the body to correspond to the upper end and the lower end of the respective one air chamber and configured to accommodate the multiple air valves, wherein a middle section of a top of the body receives the fixing element;

wherein the respective one piston element includes a large-diameter disc and a small-diameter column, and two grooves respectively defined around the large-diameter disc and the small-diameter column to fit with the multiple washers, such that the piston element is airtight with the respective one air chamber, wherein the small-diameter column has two receiving orifices corresponding to the multiple through orifices and configured to receive the multiple needle elements;

wherein a respective one needle element includes a tip formed on an end thereof;

wherein an end of a respective one air valve is configured to screw with a respective one air orifice, and the respective one air valve includes an air feeding tube fixed on the other end thereof and configured to pressurize airs into the respective one air chamber so that the respective one piston element is pushed downward or upward by the airs to extend forward or extract backward;

wherein the fixing element includes a non-circular orifice formed on a center thereof to connect with the positioning element;

wherein the rotatable element includes an opening defined therein, and multiple cutouts equidistantly defined around the opening, wherein the rotatable element is screwed with the support element, and the rotatable element includes multiple third threaded orifices defined on a top thereof;

wherein the support element includes multiple second spot-faced holes corresponding to the multiple third threaded orifices of the rotatable element and configured to fix the rotatable element;

wherein the positioning element includes a shank extending from a bottom thereof, a coupling face formed on the shank to correspond to and to be received in the non-circular orifice of the fixing element, multiple stems extending from an outer wall of the positioning element to be received in the multiple cutouts, and an accommodation notch defined on a top of the positioning element to accommodate the resilient element; and wherein the support element includes a trench corresponding to the accommodation notch of the positioning element and configured to accommodate the resilient element.

2. The angle-adjustable fixture device as claimed in claim 1, wherein the body further includes a recess defined on the middle section of the top thereof and configured to receive the fixing element, wherein the recess has two passing holes through which the two screw bolts are inserted to screw with two second threaded orifices of the fixing element.

3. The angle-adjustable fixture device as claimed in claim 1, wherein the respective one air valve includes a screwing extension corresponding to the respective one air orifice, and the air feeding tube is perpendicular to the screwing extension.

* * * * *